United States Patent [19]

Cornay

[11] Patent Number: 5,425,676
[45] Date of Patent: Jun. 20, 1995

[54] UNIVERSAL JOINT HAVING CENTERING DEVICE

[76] Inventor: Paul J. Cornay, 1707 N. Main St., Suite 304, Longmont, Colo. 80501

[21] Appl. No.: 73,686

[22] Filed: Jun. 7, 1993

Related U.S. Application Data

[63] Continuation-in-part of Ser. No. 848,089, Mar. 9, 1992, Pat. No. 5,277,659, which is a continuation-in-part of Ser. No. 545,273, Jun. 28, 1990, Pat. No. 5,094,651, which is a continuation-in-part of Ser. No. 373,183, Jun. 28, 1989, abandoned.

[51] Int. Cl.⁶ .................... F16D 3/16; F16C 1/24
[52] U.S. Cl. .................... 464/11; 464/117; 464/126; 464/147
[58] Field of Search .................... 464/7, 11, 114, 117, 464/118, 125, 126, 905, 147

[56] References Cited

U.S. PATENT DOCUMENTS

| | | | |
|---|---|---|---|
| 730,604 | 6/1903 | Brazier | 464/115 |
| 899,534 | 9/1908 | Hoffmann | 464/125 |
| 1,127,352 | 2/1915 | Buckland | 464/112 |
| 1,191,739 | 7/1916 | Schurman | 464/125 X |
| 1,216,508 | 2/1917 | Spade | 464/125 |
| 1,376,840 | 5/1921 | Thiemer | 464/12 |
| 1,381,599 | 6/1921 | Thiemer | 464/12 |
| 1,450,706 | 4/1923 | Anderson | 464/12 |
| 1,621,220 | 3/1927 | Peters | 464/125 |
| 1,697,473 | 1/1929 | Peters | 464/13 |
| 1,702,363 | 2/1929 | Peters | 464/12 |
| 1,737,535 | 11/1929 | Funnell | 464/12 |
| 1,795,264 | 3/1931 | Peters | 464/12 |
| 1,853,171 | 4/1932 | Nettenstrom | 464/125 |
| 1,887,793 | 11/1932 | Williams | 464/12 |
| 1,913,783 | 6/1933 | Williams | 464/125 X |
| 2,346,058 | 4/1944 | Waldron | 464/115 |
| 2,737,791 | 3/1956 | Dillman et al. | 464/7 |
| 2,780,079 | 2/1957 | Wahlberg | 464/7 |
| 2,986,022 | 5/1961 | Stokely | 464/905 |
| 3,064,453 | 11/1962 | Barness et al. | 464/125 |
| 4,135,372 | 1/1979 | Benson | 464/11 |
| 4,498,888 | 2/1985 | Pastor | 464/112 |
| 4,508,522 | 4/1985 | Numazawa et al. | 464/11 |
| 4,579,546 | 4/1986 | Pastor | 464/112 |
| 4,650,439 | 3/1987 | Mayhew | 464/11 |
| 4,795,401 | 1/1989 | Ende | 464/136 X |
| 4,955,741 | 9/1990 | Komeyama | 403/57 |
| 5,094,651 | 3/1992 | Cornay | 464/12 |
| 5,277,659 | 1/1994 | Cornay | 464/147 |

FOREIGN PATENT DOCUMENTS

| | | |
|---|---|---|
| 1044902 | 11/1953 | France . |
| 2854232 | 6/1980 | Germany . |
| 488667 | 7/1938 | United Kingdom . |
| 2014276A | 8/1979 | United Kingdom . |
| 2094440A | 9/1982 | United Kingdom ................ 464/125 |

OTHER PUBLICATIONS

Society of Automotive Engineers Universal Joint and Driveshaft Design Manual (AE-7) (1979) pp. 103, 112-115, 123, 124, 323, and 331.

Primary Examiner—Daniel P. Stodola
Assistant Examiner—Eileen A. Dunn
Attorney, Agent, or Firm—Pravel, Hewitt, Kimball & Krieger

[57] ABSTRACT

A universal joint includes a centering device for maintaining the joint at constant velocity. Each shaft of the joint is connected to a ball stud. Movement of one of the shafts at an angle relative to the longitudinal axis of the coupling device is transmitted to the other shaft by the centering device and the centering device causes the other shaft to likewise move at the same angle relative to the longitudinal axis of the coupling device.

8 Claims, 11 Drawing Sheets

UNIVERSAL JOINT HAVING CENTERING DEVICE

This is a continuation-in-part of co-pending U.S. patent application Ser. No. 07/848,089, filed 9 Mar. 1992, now U.S. Pat. No. 5,277,659 which is a continuation-in-part of U.S. patent application Ser. No. 07/545,273, filed Jun. 28, 1990, now U.S. Pat. No. 5,094,651, which is a continuation-in-part of U.S. patent application Ser. No. 07/373,183, filed Jun. 28, 1989, now abandoned, all hereby incorporated by reference.

BACKGROUND OF THE INVENTION

1. Field of the Invention

The present invention relates to universal joints having centering devices.

2. General Background of the Invention

Universal joints are used in a multitude of industries, including the aerospace, automotive, and marine industries. The aerospace industry uses universal joints, for example, to transfer power to control surfaces. Universal joints are used in steering columns in automobiles to transfer power. Universal joints are used in boat motors. In addition, universal joints can be found in everything from tractors to robots.

Information about universal joints can be found, for example, in the Society of Automotive Engineers Universal Joint and Driveshaft Design Manual (AE-7) (1979), hereby incorporated by reference.

SUMMARY OF THE INVENTION

The present invention is a universal joint especially designed for high operating angle and high r.p.m. applications. A first embodiment of the joint comprises a ball, a hemispherical split-cup shaped yoke, and a ring. The ball is inside the yoke, which is inside the ring. Pins connect the ring to the yoke and to the ball.

A first shaft is connected to the ball and a second shaft is connected to the yoke.

The yoke is cup-shaped internally to have the closest fit to the ball. The yoke is cup-shaped externally to have the closest fit to the ring. The cup shape of the yoke enables it to withstand centrifugal and torsional loads better than conventional Y-shaped yokes.

The ring, the shaft, the ball, and the yoke are each formed from components which are circularly symmetrical about their own longitudinal axes. This shape of the components allows the joint to be manufactured in computerized lathes and allows the joint to run at higher angles and at higher r.p.m. with less vibration than other universal joints.

Having the ball inside the yoke with the yoke inside the ring causes the bulk of the mass of the universal joint to be closer to the spin axis of the universal joint than would be possible if the ring were between the ball and the yoke. This reduces the effects of centrifugal force, allowing for greater dynamic joint stability. The yoke is beveled to minimize its size and maximize its strength, while maximizing the operating angle of the joint.

Having the ball inside the yoke enables the joint to be misaligned at angles up to and beyond 45° in less lateral distance (that is, distance along the longitudinal axis of the joint) than in conventional Cardan-type joints.

All pivotal motion of the joint takes place in the ring, where the pins connecting the ring to the ball and to the yoke are surrounded by needle bearings. Lubrication of the pins and bearings is achieved by means of an annular lubricant-filled channel in the ring. Lubricant ports are provided to allow the channel to be filled with lubricant.

The preferred embodiment of the present invention is a universal joint comprising a dual trunnion, a hemispherical split-cup shaped yoke, and a ring. The dual trunnion is inside the yoke, which is inside the ring. Pins connect the ring to the yoke and to the dual trunnion.

A first shaft is connected to the dual trunnion and a second shaft is connected to the yoke.

The yoke is shaped internally to have a close fit to the dual trunnion while allowing the dual trunnion to freely move therein at the desired operating angle of the joint without contact of the two parts. The yoke is cup-shaped externally to have the closest fit to the ring while allowing the ring to oscillate therearound without contact of the two parts. The cup shape of the yoke enables it to withstand centrifugal and torsional loads better than conventional Y-shaped yokes.

The ring and the yoke are each formed from components which are circularly symmetrical about their own longitudinal axes. This shape of the components allows the joint to be manufactured in computerized lathes which facilitates balancing and allows the joint to run at higher angles and at higher r.p.m. with less vibration than other universal joints.

Having the dual trunnion inside the yoke with the yoke inside the ring causes the bulk of the mass of the universal joint to be closer to the spin axis of the universal joint than would be possible if the ring were between the dual trunnion and the yoke. This reduces the effects of centrifugal force, allowing for greater dynamic joint stability. The yoke is beveled internally to minimize its size and maximize its strength, while maximizing the operating angle of the joint.

Having the dual trunnion inside the yoke enables the joint to be misaligned at angles up to and beyond 45° in less lateral distance (that is, distance along the longitudinal axis of the joint) than in conventional Cardan-type joints.

All pivotal motion of the joint takes place in the ring, where the pins connecting the ring to the dual trunnion and to the yoke are surrounded by needle bearings. Lubrication of the pins and bearings is achieved by means of a non-continuous annular lubricant-filled channel in the ring. Lubricant ports are provided to allow the channel to be filled with lubricant. Bearing assemblies having two lubricant ports located in the outer race and 180° apart are in communication with the annular lubricant channel in the ring allowing the lubricant to be pumped through the ring and through all four bearing assemblies. The two adjacent lubricant ports in the ring are only connected by the non-continuous annular channel with there being no communication in the shortest distance between the two ports in the ring. This is advantageous over other ring designs by omitting the chance of a blockage in the lubricant channel causing the lubricant to follow the path of least resistance thereby not lubricating all four bearing assemblies. In addition, the non-continuous lubricant channel with an entry and exit port allows the system to be purged, replacing old lubricant with new.

The joints are designed to accommodate an operating angle of up to 45° between the drive shaft and the driven shaft.

Two joints, as described above, can be connected with a common shaft between the two yokes, producing a joint capable of accommodating an angle between the drive and driven shafts of up to 90° in less lateral distance than in other joint designs known to the inventor.

There may be some advantages associated with the use of the input, output, and center shafts having their mass concentrated near the axes of rotation and rings having a larger moment of inertia resisting changes in operating speed than the moment of inertia resisting oscillation. This may reduce the transmission of vibration, especially at large shaft angles. Having the mass of the hourglass-shaped yoke located nearest the center of rotation greatly reduces the effect of inertial vibrations caused by the non-uniform motion of this member in a double-joint configuration. Comparative testing against a typical double-Cardan design showed that the present invention can have up to 75% less vibration when run at high angles and speeds. In addition, the hemispherical cups as well as the rings may facilitate balancing the unit and this may contribute to vibration control as well.

When the universal joint of the present invention is a double universal joint, it is preferable to use a centering device to maintain the angular velocity ratio of the input shaft and the output shaft as close to unity as possible.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

Figure 1:
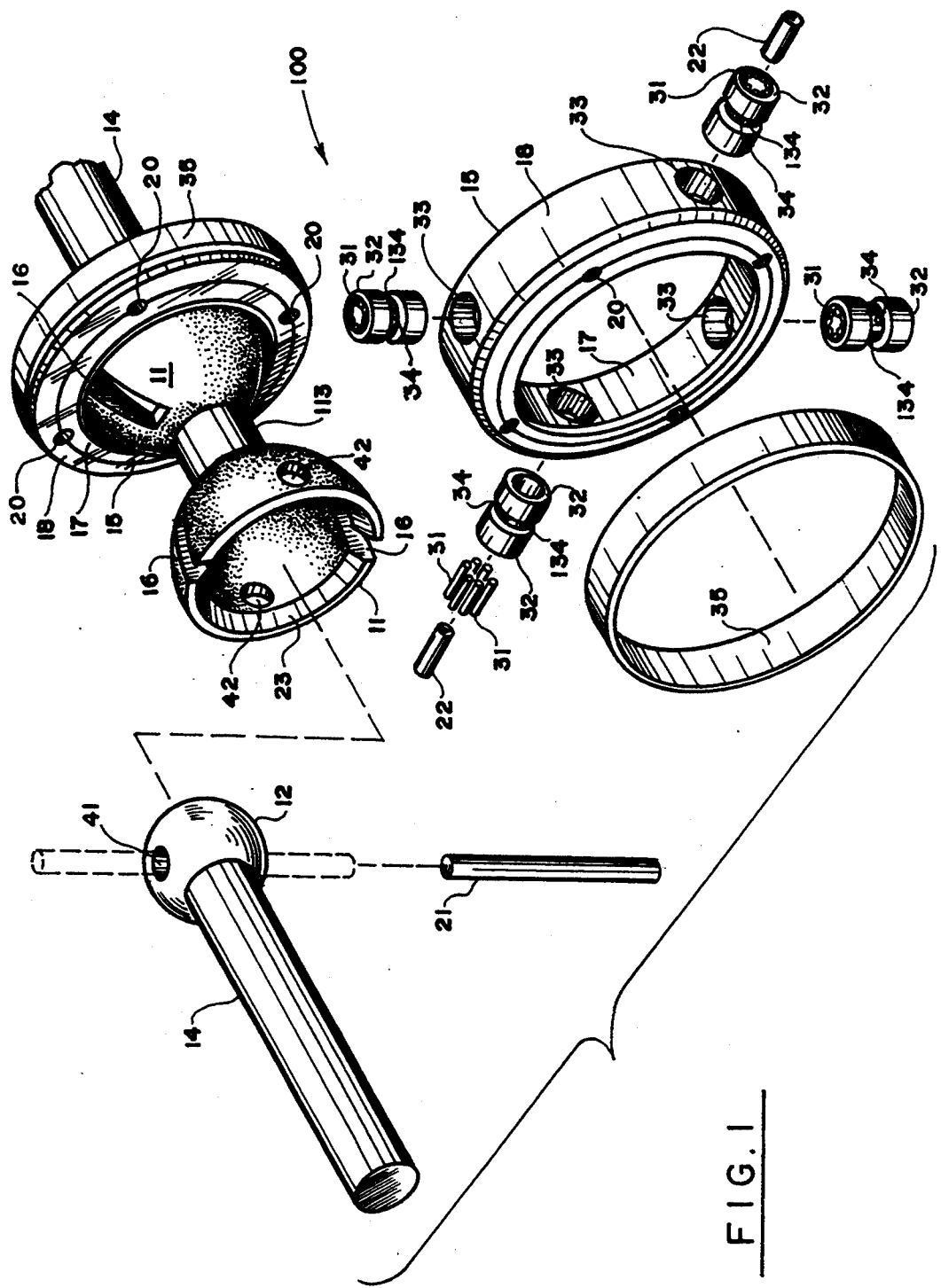
FIG. 1 is an exploded view of a universal joint in accordance with the present invention.

Parts List:

The following is a list of suitable parts and materials for the various elements of the present invention.
10 Universal joint
11 hemispherical split-cup yoke (AISI 4340 metal alloy)
12 ball (AISI 4340)
13 shaft (AISI 4340)
14 shaft (AISI 4340)
15 ring (AISI 4340)
16 notches in yoke 11
17 inner ring member (AISI 4340)
18 outer ring member (AISI 4340)
19 channel in ring 15
20 lubricant ports in ring 15
21 long pin (AISI 1060 with a hardness of 60–65 Rockwell C)
22 short pin (AISI 1060 with a hardness of 60–65 Rockwell C)
23 bevel in yoke 11
31 needle bearings
32 races
33 holes in ring 15
34 holes in races 32
35 band of material, preferably metal with an inner surface induction hardened to a depth of 0.075 cm to a hardness of Rockwell C 60
41 hole in ball 12
42 hole in yoke 11
100 universal joint
113 shaft (AISI 4340)
134 channel in races 32
200 universal joint
213 shaft (AISI 4340)
300 universal joint
310 universal joint
311 hemispherical split-cup yoke (AISI 4340)
312 dual trunnion (AISI 4340)
313 shaft (AISI 4340)
314 shaft (AISI 4340)
315 ring (AISI 4340)
316 notches in yoke 311
317 inner ring member (AISI 4340)
318 outer ring member (AISI 4340)
319 channel in ring 315
320 lubricant port in ring 315
321 long pin (AISI 1060 with a hardness of 60–65 Rockwell C)
322 short pin (AISI 1060 with a hardness of 60–65 Rockwell C)
323 beveled inner radial surface of yoke 311
324 beveled inner surface of yoke 311
325 beveled flat surface of yoke 311
326 Lubricant port in ring 315
327 flush-fitting NPT allen-head plug
328 flush-fitting NPT allen-head plug
330 closed-end needle bearing assembly (modified Torrington bearing number M-1081-20H)
332 races
333 holes in ring 315
334 holes in races 332
336 internal snap rings 337 snap-ring grooves in holes 333
338 polytetrafluoroethylene (PTFE) spacer rings
339 rubber O-ring (Bruna-N 90 Durometer, such as Parker No. 2-016)
340 shaft (AISI 4340)
341 hole in dual trunnion 312
342 hole in yoke 311
410 universal joint
415 ring (AISI 4340)
419 channel in ring 415
500 universal joint
511 hemispherical split-cup yoke (AISI 4340)
513 shaft (AISI 4340) of universal joint 310
514 shaft (AISI 4340) of universal joint 500
530 closed-end needle bearing assembly (modified INA bearing number BA1610S or BA1610.1S or F207360.1)
531 needle bearings
532 races
539 elastomer-type lip seal, such as seal found in INA bearing number BA1610S or BA1610.1S or F207360.1)
540 shaft (AISI 4340) of universal joint 500
550 coupling member comprising hemispherical split-cup yokes 511 and shaft 613
600 universal joint of the sixth embodiment of the invention
610 universal joint of the seventh embodiment of the invention
613 shaft (AISI 4340) of universal joint 500
700 centering device of joint 500
711 socket of centering device 700
712 ball stud (plain medium carbon steel forgings, heat treated to a typical hardness range of BHN 255-285) of centering device 700
738 elastomer-type lip seal, such as the type described in the above-mentioned SAE design manual on page 114)
739 rubber O-ring (Bruna-N 90 Durometer)
740 groove in centering plate 770
770 centering plate of centering device 700
771 centering pin of centering device 700
772 centering sleeve of centering device 700
773 lubrication bore in ball-pin centering plate 774 (preferred, but optional)
774 ball-pin centering plate
775 spring
776 bore in coupling member 550
777 cavities in shafts 514 and 540
778 hole in centering sleeve 772

DETAILED DESCRIPTION OF THE PREFERRED EMBODIMENTS

Referring now to the drawings, universal joint 10 (FIGS. 5 and 6), comprises a hemispherical split-cup yoke 11, a ball 12, a shaft 13, a shaft 14, and a ring 15.

Yoke 11 has a substantially hemispherical outer surface and a concentric, substantially hemispherical inner surface.

A relatively long pin 21 extends through a hole 41 (see FIG. 1) in ball 12 into ring 15. Relatively short pins 22 connect yoke 11 with ring 15. The first and second ends of pin 21 are pivotally received in ring 15 and are surrounded by needle bearings 31. A first end of each pin 22 is received in holes 42 in yoke 11 and a second end of each pin 22 is pivotally received in ring 15. The second end of each pin 22 is surrounded by needle bearings 31. A band 35 of material, preferably metal, encircles ring 15, and prevents needle bearings 31 and pins 21 and 22 from protruding out of ring 15. Band 35 also acts as a seal to hold in lubricant. Needle bearings 31 are contained in races 32 which press-fit into holes 33 (see FIG. 1) in ring 15. The press fit of races 32 in holes 33 prevents needle bearings 31 from moving inward toward the center of universal joint 10. Races 32 have a channel 134 therein to allow lubricant to pass therearound and two holes 34 therein to allow lubricant to pass therethrough. Holes 34 in races 32 align with a channel 19 in ring 15. The bearing assembly comprising races 32 and needle bearings 31 can advantageously be made by modifying Torrington bearing assembly number BH-108-20H.

When a sealed closed-end needle bearing assembly similar to Torrington Bearing Part No. M-11101-OH is used in place of the open-end bearing assembly comprising race 32 and needle bearings 31, band 35 may be omitted.

Yoke 11 has notches 16 to allow pin 21 to move therein.

Shaft 14 is fixedly attached to ball 12; shaft 14 and ball 12 may be integral. Shaft 13 and yoke 11 are fixedly attached to one another; they may be integral.

Figure 4:
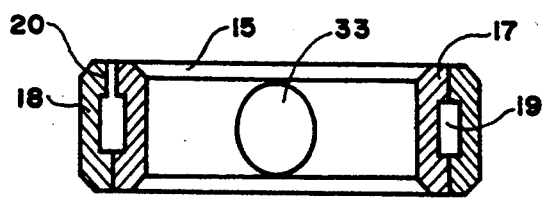
FIG. 4 is a sectional view of the pivot ring of the first and second embodiments of the present invention.

Ring 15 comprises an inner ring member 17 and an outer ring member 18 (see FIG. 4). A portion of channel 19 is in each ring member in the form of an annular recess. Ring members 17 and 18 are sized such that inner ring member 17 may be press-fit into outer ring member 18 to form channel 19 as a lubricant-tight channel. Races 32 help to hold ring 15 together by preventing movement of inner ring member 17 with respect to outer ring member 18.

Ring 15 has a number of lubricant ports 20 communicating with channel 19. Lubricant ports 20 may be sealed with, for example, removable screw plugs (not shown). Lubricant ports 20 allow one to add lubricant to channel 19, change the lubricant in channel 19, or purge lubricant from channel 19.

The edge of yoke 11 has a bevel 23 to permit shaft 14 to misalign up to a full angle A (preferably 45°- see FIG. 6) with respect to the longitudinal axis of shaft 13. When operational conditions do not require angle A to be so large, bevel 23 may be omitted.

Prior to the forming of holes 33, 41, and 42 and notches 16, ring 15, ball 12, yoke 11, and shafts 13 and 14 are each circularly symmetrical about their longitudinal axes.

Figure 2:
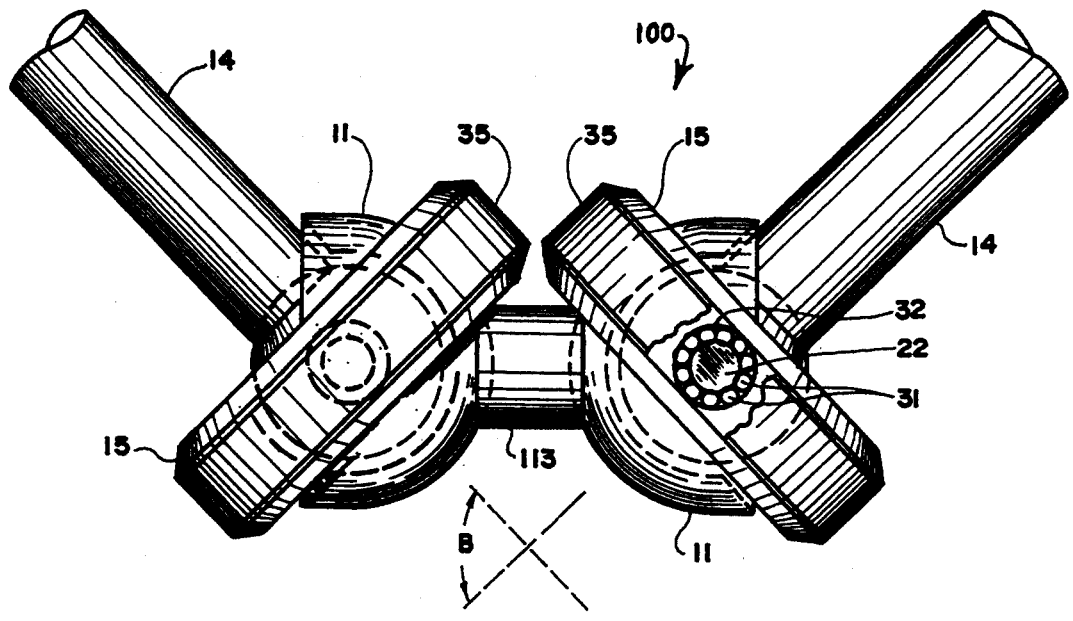
FIG. 2 is a side view of the embodiment of the invention shown in FIG. 1.
Figure 3:
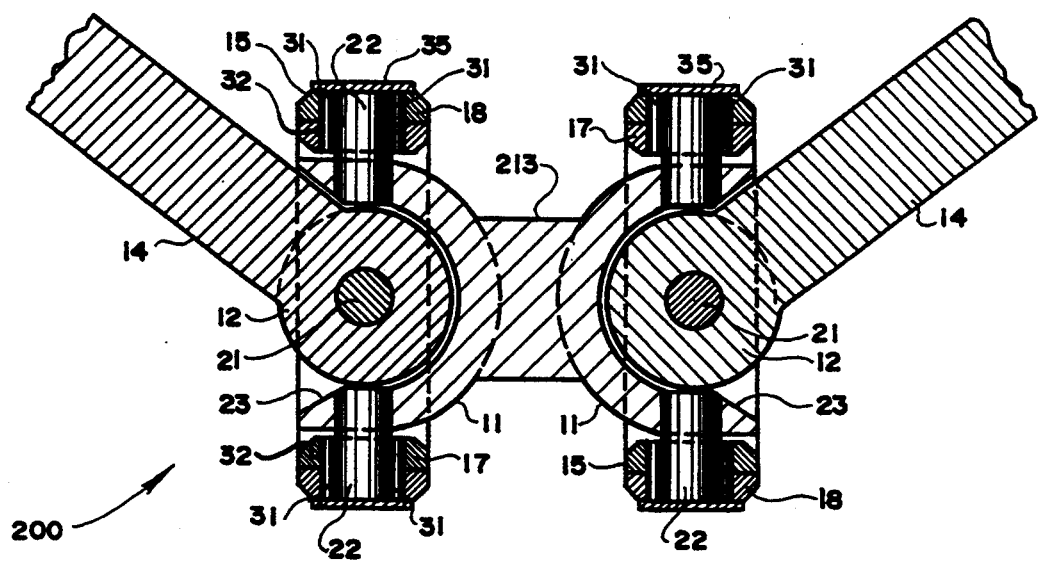
FIG. 3 is a sectional view of an alternative embodiment of the present invention.

Universal joint 100 (FIGS. 1 and 2) is similar to universal joint 10. Universal joint 100 has two hemispherical split-cup yokes 11 joined by a shaft 113 which is fixedly attached to the yokes. The two yokes 11 and the shaft 113 may be integral. Shafts 14 of universal joint 100 may be flexed up to an angle B relative to one another. Angle B is preferably 90°. The diameter of shaft 113 limits the size of angle B when the universal joint is in the position shown in FIG. 2. If the desired application does not require that the shafts 14 be offset by an angle as great as angle B in FIG. 2, the diameter of the shaft connecting yokes 11 can be greater than that of shaft 113. FIG. 3 shows a universal joint 200 having such a shaft 213. Shaft 213 is advantageous over shaft 113 because its increased diameter gives it increased strength and greater dynamic stability.

Figure 5:
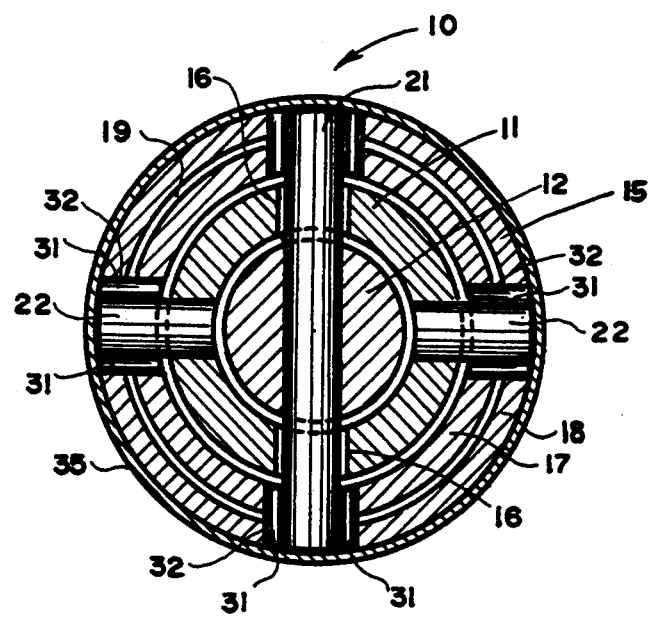
FIG. 5 is a sectional view taken along the lines 5—5 in FIG. 6.
Figure 6:
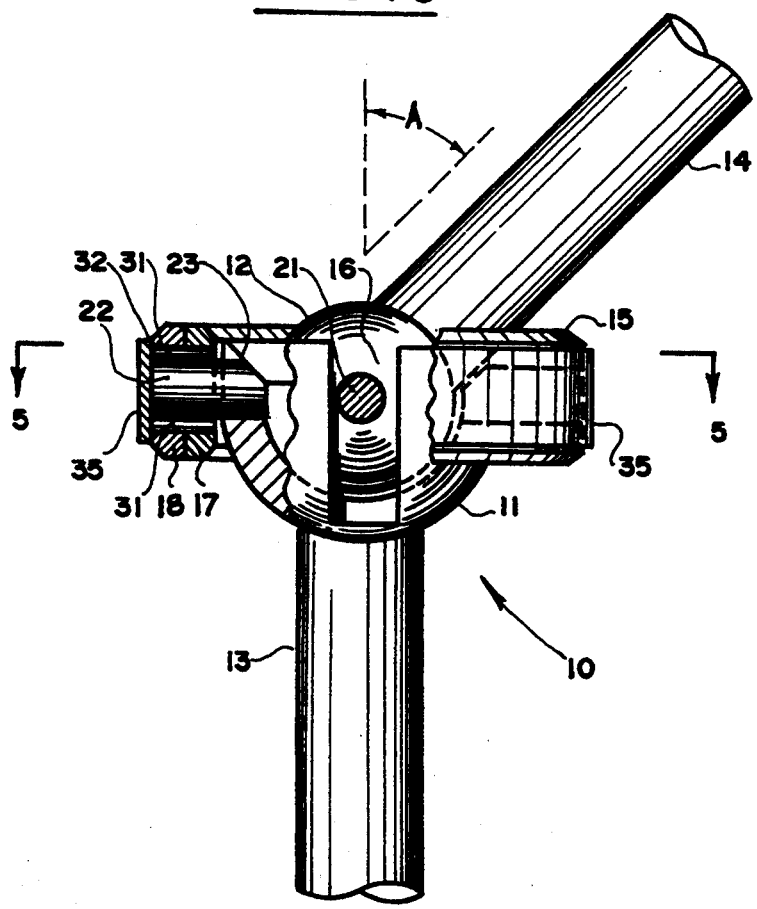
FIG. 6 is a partially cut-away view of a third embodiment of the universal joint of the present invention.

Universal joint 10 is assembled and made ready for use by: press-fitting inner ring member 17 into outer ring member 18; press-fitting races 32 having needle bearings 31 therein into holes 33 in ring 15; placing ring 15 such that two holes 33 align with holes 42 in yoke 11 and inserting pins 22 through races 32 and press-fitting pin 22 into holes 42; inserting ball 12 into yoke 11 and aligning it such that hole 41 aligns with two holes 33 in ring 15, and inserting pin 21 through holes 33 in ring 15 and press-fitting it into hole 41 in ball 12 so that an equal amount of pin 21 protrudes from each side of ball 12; press-fitting band 35 over ring 15; and pumping lubricant into channel 19 through one of lubricant ports 20 and out of another lubricant port 20. The lubricant passes through channels 134 and holes 34 in races 32 to lubricate needle bearings 31. As can be seen in FIG. 5, all needle bearings 31 share the lubricant in channel 19.

Although lubricant ports 20 are shown in the ring 15 in the upper part of FIG. 1 as being on the surface facing the second ring 15, it is preferable for the ports 20 to be on the opposite surface of ring 15 (as shown in the lower ring 15 in FIG. 1) so that access to ports 20 is easier when joint 100 is installed.

Either shaft 13 or 14 can be connected to a drive shaft; the other is connected to the driven shaft. These connections can be made by any conventional means.

Another embodiment of the present invention, universal joint 310 (FIGS. 11 and 12), comprises a hemispherical split-cup yoke 311, a dual trunnion 312, a shaft 513, a shaft 340, and a ring 315.

Figure 7:
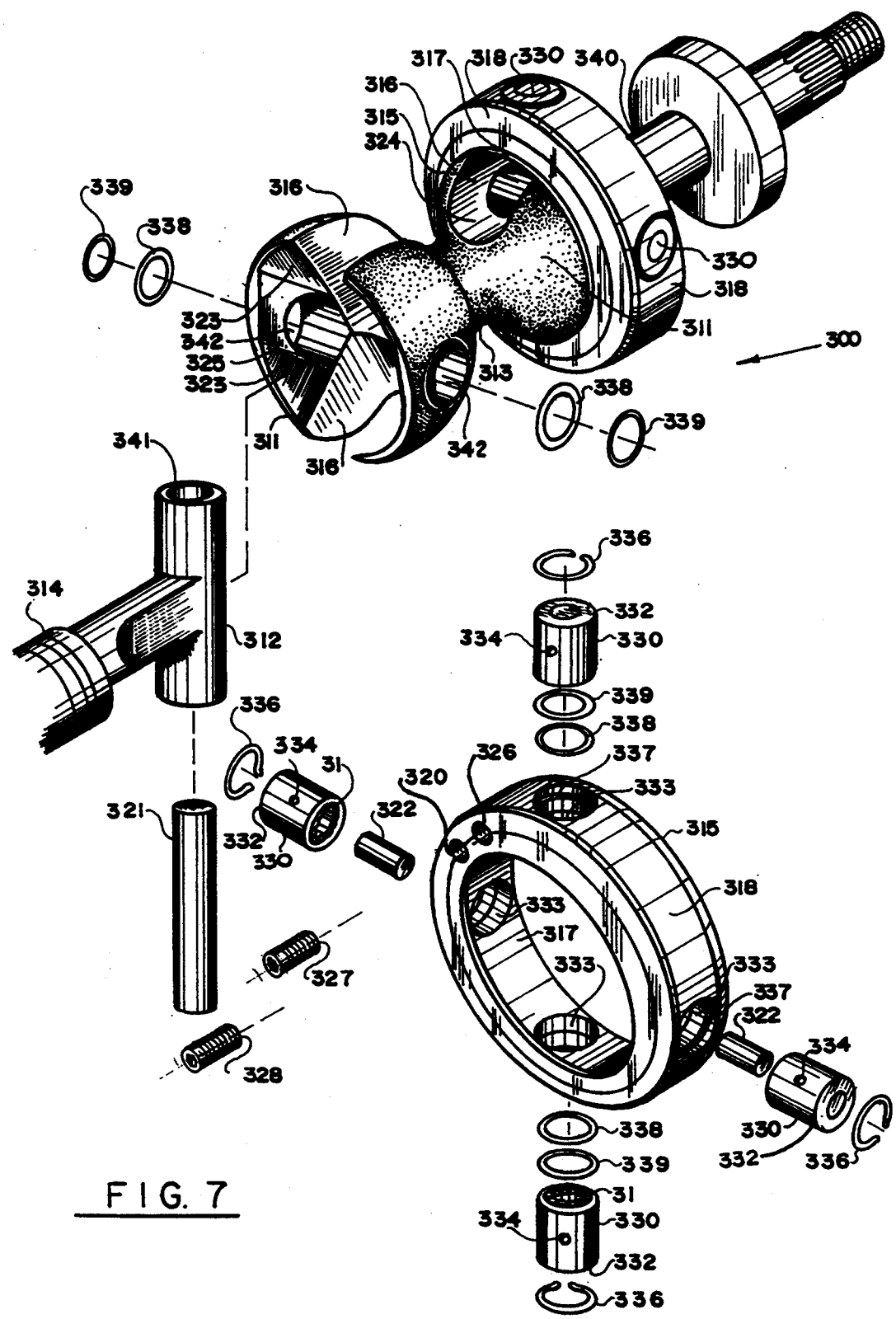
FIG. 7 is an exploded view of a fourth embodiment of the universal joint of the present invention.

Yoke 311 has a substantially hemispherical outer surface and a concentric, substantially hemispherical inner surface. Yoke 311 (FIG. 7) includes a beveled inner radial surface 323.

A relatively long pin 321 extends through a hole 341 (see FIG. 7) in dual trunnion 312 into ring 315. Relatively short pins 322 connect yoke 311 with ring 315. The first and second ends of pin 321 are pivotally received in closed-end needle bearing assemblies 330 in ring 315. A first end of each pin 322 is received by a shrink fit or press fit in holes 342 in yoke 311 and a second end of each pin 322 is pivotally received in ring 315. The second end of each pin 322 is received in closed-end needle bearing assemblies 330. Closed-end needle bearing assemblies 330 include needle bearings 31 which are contained in races 332 which press-fit into holes 333 (see FIG. 7) in ring 315. Races 332 have two holes 334 therein, 180° apart, to allow lubricant to pass therethrough. Holes 334 in races 332 align with a channel 319 in ring 315. Closed-end needle bearing assemblies 330 are secured by internal snap rings 336 which fit into snap-ring grooves 337 in holes 333.

Yoke 311 has notches 316 to allow pin 321 to move therein.

Shaft 340 is fixedly attached to trunnion 312; shaft 340 and trunnion 312 may be integral. Shaft 513 and yoke 311 are fixedly attached to one another; they may be integral.

Figure 10:
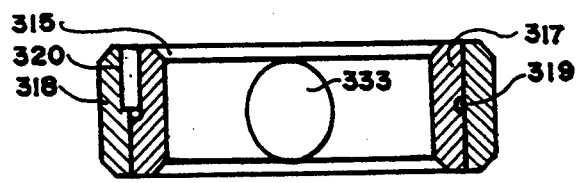
FIG. 10 is a sectional view of the pivot ring of the fourth embodiment of the present invention.
Figure 11:
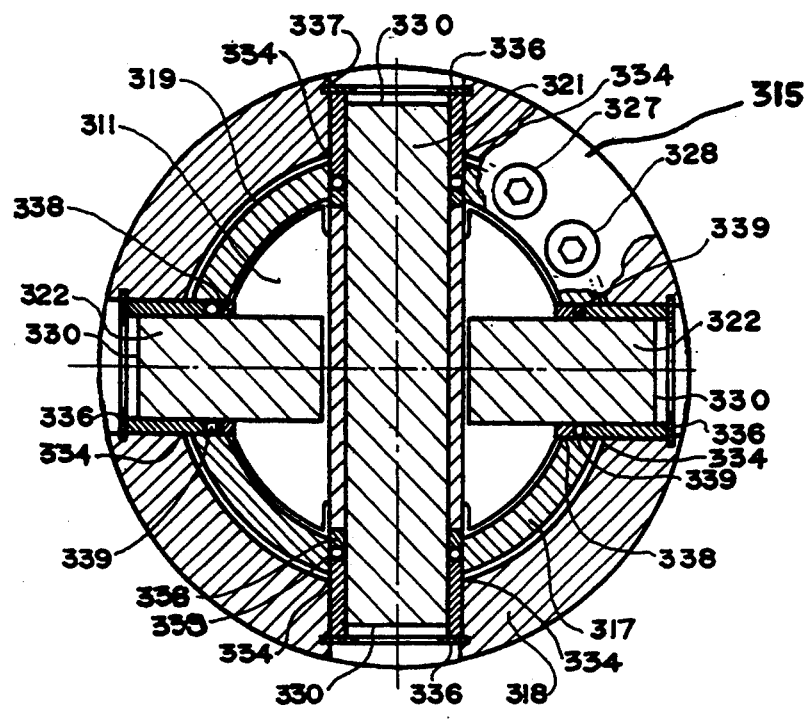
FIG. 11 is a sectional view taken along the lines 11—11 in FIG. 12.
Figure 12:
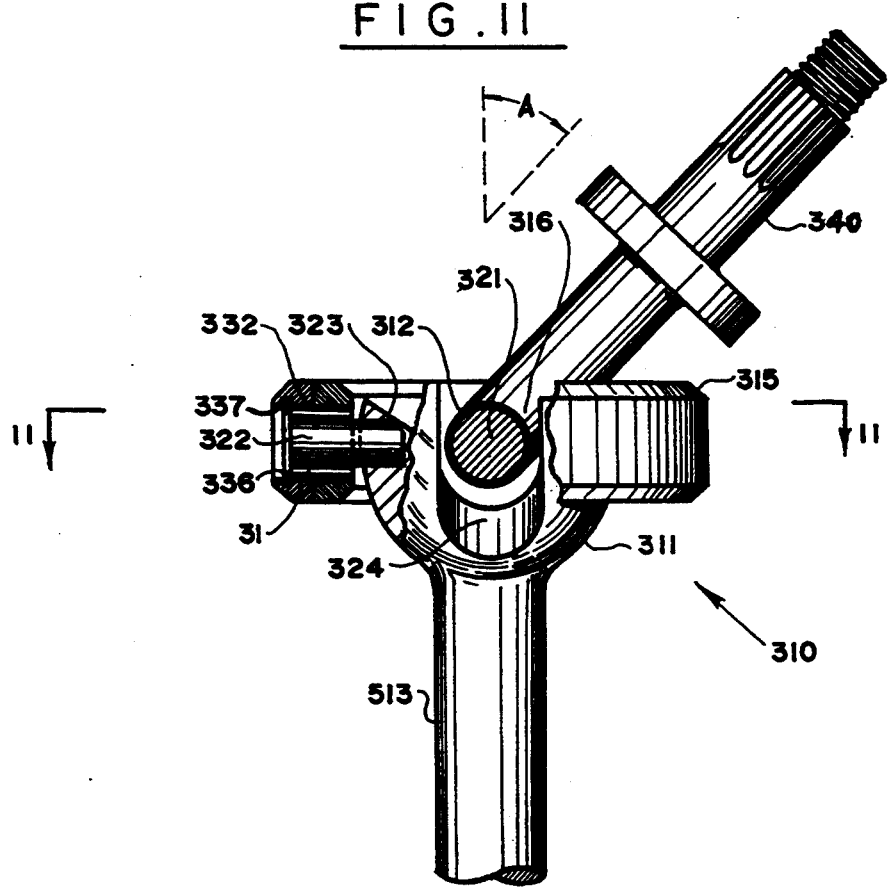
FIG. 12 is a partially cut-away view of a fifth embodiment of the universal joint of the present invention.

Ring 315 comprises an inner ring member 317 and an outer ring member 318 (see FIG. 11). Channel 319 is in ring member 317 and is in the form of a non-continuous annular recess whose cross section is semi-circular in shape (see FIG. 10). Channel 319 is preferably formed by machining a groove in the outer diameter of ring member 317 before assembling ring 315. Ring members 317 and 318 are sized such that inner ring member 317 may be press-fit into outer ring member 318 to form channel 319 as a lubricant-tight channel. Races 332 help to hold ring 315 together by preventing movement of inner ring member 317 with respect to outer ring member 318.

Ring 315 has two lubricant ports, 320, 326, communicating with non-continuous annular channel 319. Lubricant ports 320, 326, are located on top of ring 315 and are centered over channel 319. Ports 320 and 326 are adjacent one another and each port communicates with one end of channel 319. Channel 319 does not extend completely around ring 315; rather, channel 319 extends around in ring 315 almost 360° from port 320 to port 326. Lubricant ports 320 and 326 may be sealed with, for example, removable flush fitting NPT allen-head plugs 327, 328. Bearing assemblies 330 are lubricated by removing allen-head plugs 327, 328, and threading a lubricant gun (not shown) into either lubricant port 320, 326 and lubricating by conventional means. Lubricant ports 320, 326, allow one to add lubricant to channel 319, change the lubricant in channel 319, or purge lubricant from channel 319 by forcing the lubricant through all four bearing assemblies 330 (via holes 334 in races 332) before exiting ring 315. Lubricant can be pumped into channel 319 form either port 320 or 326, allowing purging of the system from either direction. Because channel 319 does not extend completely around in ring 315, lubricant pumped into port 320 can travel in only one direction before lubricant exits out of port 326, thus forcing lubricant to contact all bearing assemblies 330 before exiting channel 319. Having two holes 334 spaced 180° apart in each race 332 forces lubricant to travel through all bearing assemblies 330 (via holes 334) before exiting channel 319. This ensures that lubrication will reach all needle bearings 31. Further, one can see in FIG. 11 that holes 334 are positioned adjacent the inner end of bearing assemblies 330. This positioning helps to ensure that centrifugal force will aid in causing the lubricant to fill assemblies 330.

The interior of yoke 311 has a conical bevel 324 and a flat bevel 325 to permit shaft 340 to misalign up to a full angle A (preferably 45°) with respect to the longitudinal axis of shaft 513 while maintaining maximum strength of yoke 311.

Prior to the forming of holes 333, 341, and 342 and notches 316, ring 315, and yoke 311 are each circularly symmetrical about their longitudinal axes.

Yoke 311 preferably has a flat outer surface adjacent holes 342 (see FIG. 7) for accommodating a spacer ring 338. Spacer rings 338 compress O-ring 339 to ensure that O-ring 339 is compressed on three sides: the inner diameter by pins 321, 322; the front by races 332; and the back by spacer rings 338. O-rings 339 seal bearing assemblies 330 to prevent lubricant from escaping from between pins 321, 322 and races 332. Rings 338 and 339 and the flat exterior surface adjacent holes 342 may be omitted if closed-end bearings with built-in seals are used.

Figure 8:
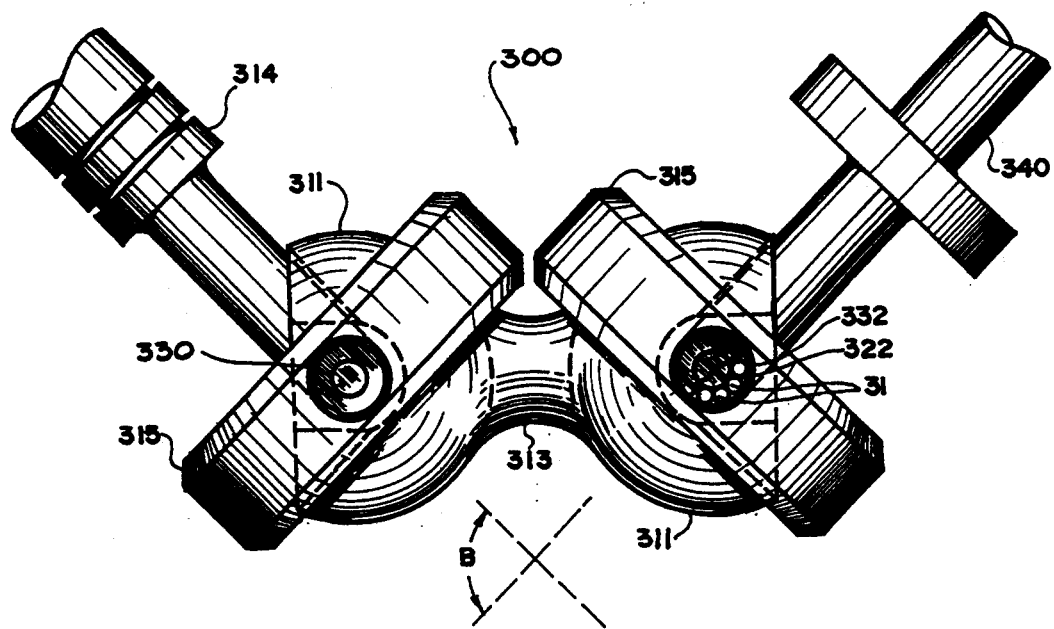
FIG. 8 is a side view of the fourth embodiment of the present invention.
Figure 9:
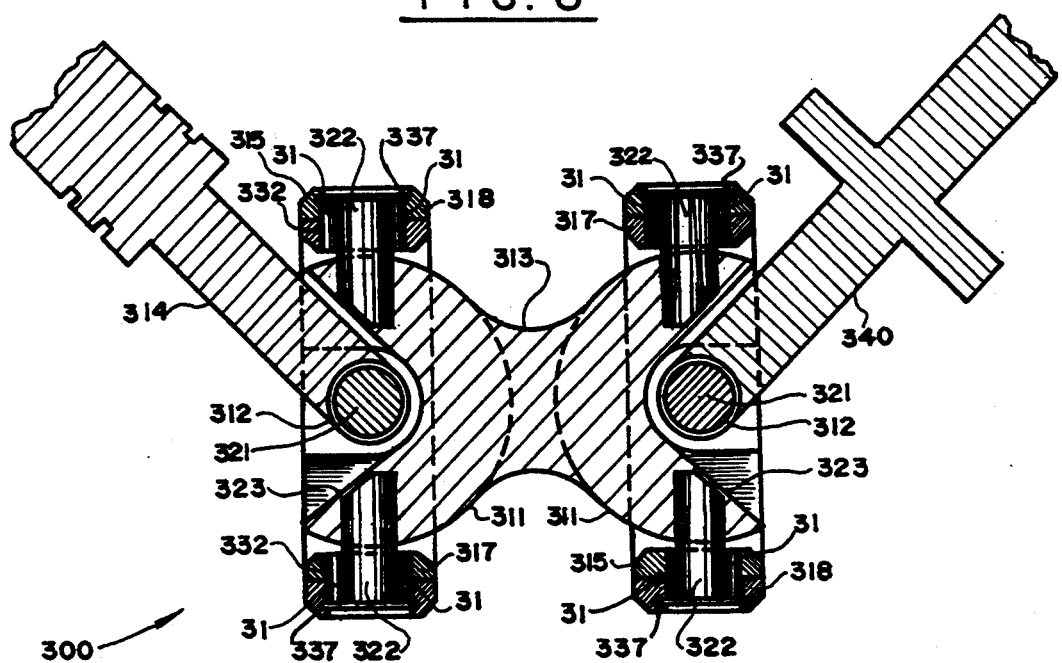
FIG. 9 is a sectional view of the fourth embodiment of the present invention.

Universal joint 300 (FIGS. 7–9) is similar to universal joint 310. Universal joint 300 has two hemispherical split-cup yokes 311 joined by a shaft 313 which is fixedly attached to the yokes. Shaft 313 blends into yokes 311 with a smooth radius forming an hourglass-shaped component. The two yokes 311 and the shaft 313 may be (and preferably are) integral. Shafts 314 and 340 of universal joint 300 may be flexed up to an angle B relative to one another. Angle B is preferably 90°. Universal joint 300 can operate at 90° in less lateral distance than can other universal joint designs known to the inventor. The size of angle B is limited by the contact of shafts 314 and 340 with yoke 311 when universal joint 300 is in the position shown in FIG. 8. If the desired application does not require that the shafts 314 and 340 be offset by an angle as great as angle B in FIG. 8, the diameter of the shaft connecting yokes 311 can be greater than that of shaft 313. Increasing the diameter of a shaft such as shaft 313 gives it increased strength and greater dynamic stability.

Universal joint 310 is assembled and made ready for use by: inserting yoke 311 into ring 315, with lubricant ports 320 and 326 facing outward, such that two holes 333 align with holes 342 in yoke 311; inserting pins 322 into holes 333 and pressing pins 322 into holes 342 of yoke 311; inserting PTFE spacer rings 338 over pins 322 in holes 333; inserting O-rings 339 over pins 322 in holes 333 and then pressing closed-end bearing assemblies 330 into holes 333 and over pins 322 until the ends of bearing assemblies 330 are flush with snap-ring grooves 337; securing bearing assemblies 330 in holes 333 by inserting snap rings 336 into snap-ring grooves 337; inserting dual trunnion 312 into yoke 311 and aligning it such that hole 341 aligns with holes 333 in ring 315; inserting long pin 321 into holes 333 and pressing long pin 321 into hole 341 until equal amounts of pin 321 extend out both ends of hole 341 in dual trunnion 312; inserting PTFE spacer rings 338 over both ends of pin 321 in holes 333; inserting O-rings 330 over both ends of pin 321 in holes 333 and pressing closed-end bearing assemblies 330 into holes 333 and over both ends of pin 321 until the ends of bearing assemblies 330 are flush with snap-ring grooves 337; securing bearing assemblies 330 in holes 333 by inserting snap rings 336 into snap-ring grooves 337; and pumping lubricant into channel 319 through one of lubricant ports 320, 326, and out of the other lubricant port. The lubricant passes through holes 334 in races 332 to lubricate needle bearings 31. As can be seen in FIG. 11, all needle bearings 31 share the lubricant in channel 319.

Either shaft 513 or 340 can be connected to a drive shaft; the other is connected to the driven shaft. These connections can be made by any conventional means.

Figure 13:
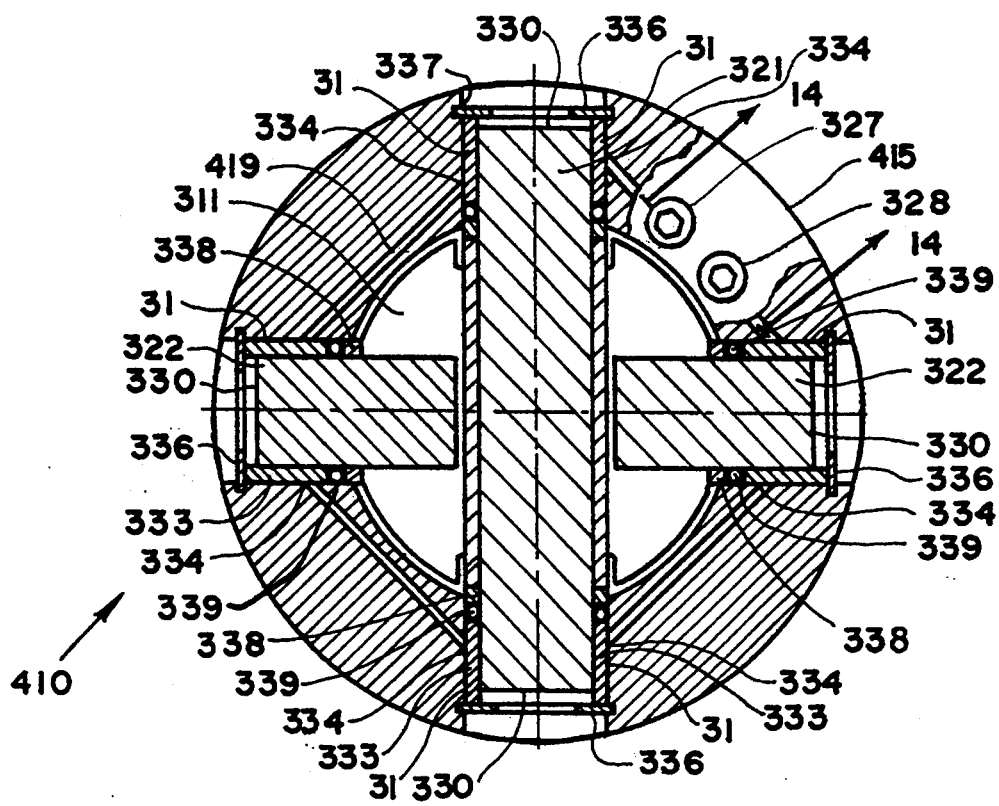
FIG. 13 is a sectional view, similar to FIG. 12, of a sixth embodiment of the present invention.
Figure 14:
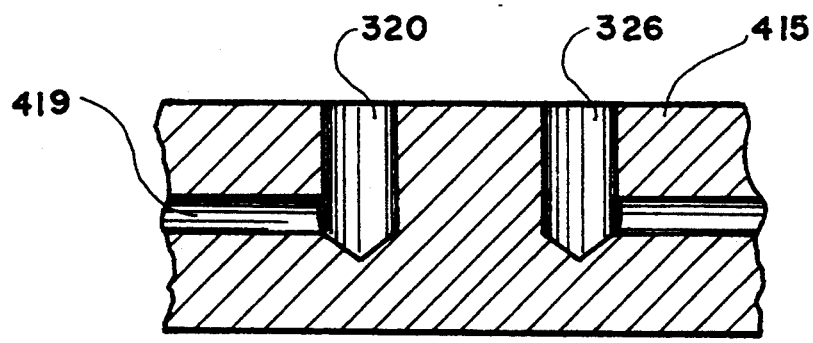
FIG. 14 is a sectional view taken along the lines 14—14 in FIG. 13.
Figure 15:
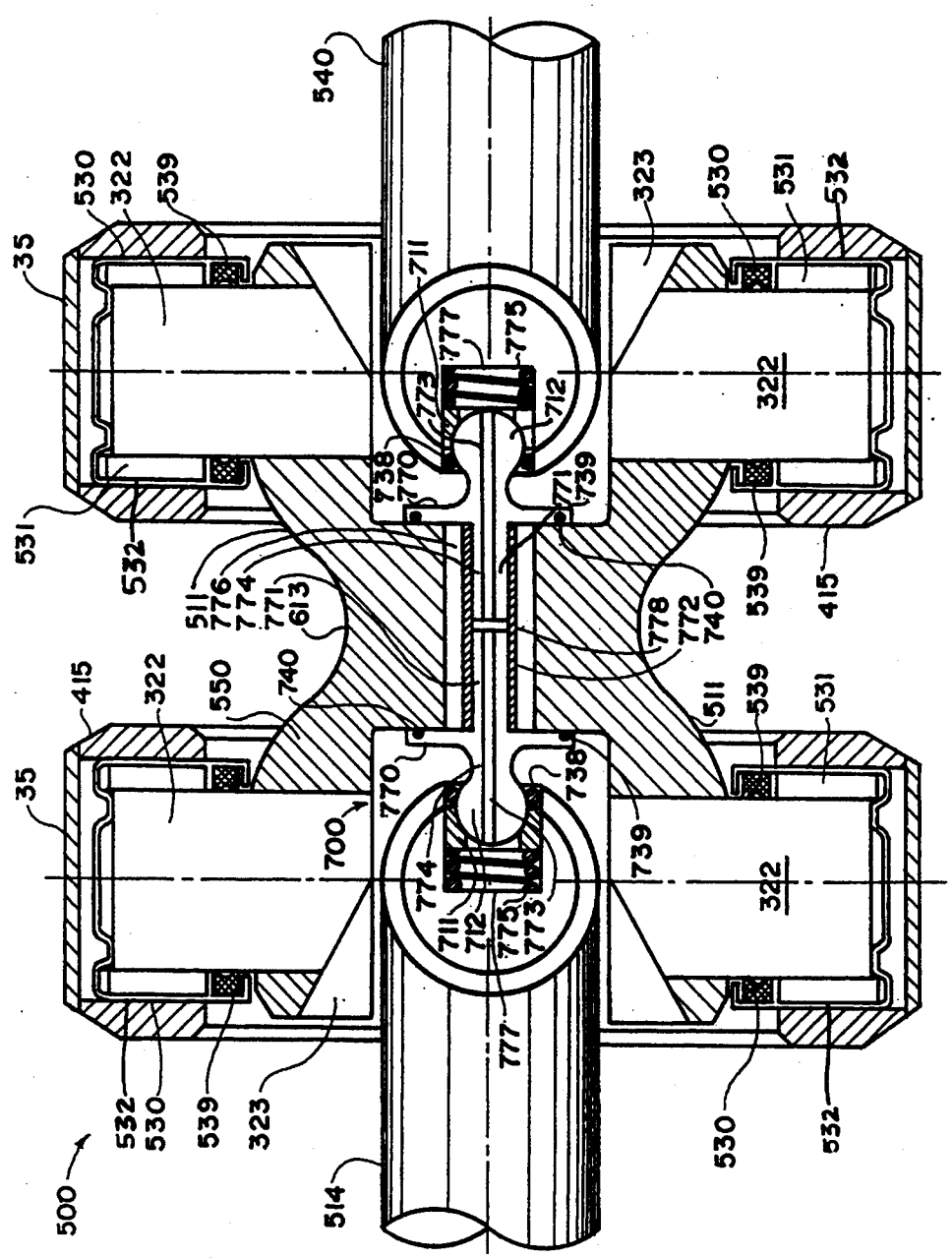
FIG. 15 is a sectional view of a fifth embodiment of the present invention.
Figure 16:
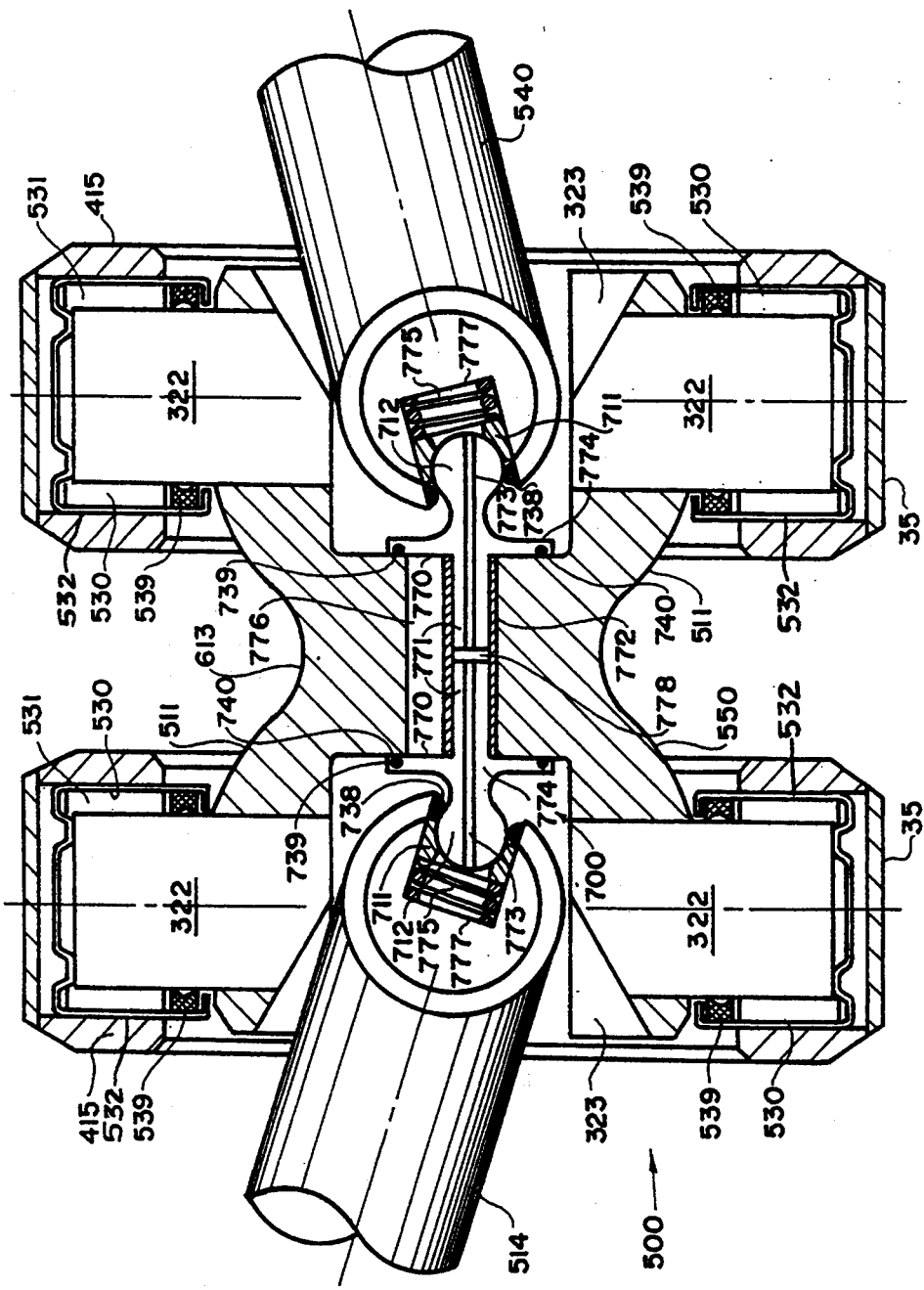
FIG. 16 is a sectional view of the fifth embodiment of the present invention, showing the input and output shafts at an angle.

Universal joint 410, shown in FIGS. 13 and 14, is similar to universal joint 310, the only difference being a ring 415 which replaces the ring 315 of joint 310, and a channel 419 which replaces lubricant channel 319. As can be seen in FIG. 13, ring 415 is unitary, as opposed to ring 315, which is composed of inner ring member 317 and outer ring member 318. Lubricant channel 419 differs from lubricant channel 319 in that lubricant channel 319 is formed in inner ring member 317, while lubricant channel 419 is formed by drilling three lubricant channel segments from one hole 333 in ring 415 to another, a lubricant channel segment from lubricant port 320 to one hole 333, and a lubricant channel segment from lubricant port 326 to another hole 333. Ring 415 is advantageous in that it is simpler to manufacture than ring 315 since it is made from a single piece of metal. Channel 419 is advantageous because the end of the lubricant channel segments adjacent holes 33 are furthest from the center of rotation of ring 415 - therefore, centrifugal force causes any lubricant in the lubricant channel segments of channel 419 to migrate during use toward bearing assemblies 330, ensuring that the lubricant will be where it is needed during use. Once lubricant is in bearing assemblies 330, centrifugal force causes it to migrate toward the outermost ends of needle bearings 31. Also, the centers of the channel segments are at about the same distance from the center of rotation as are the innermost ends of needle bearings 31; hydrostatic forces work in combination with this configuration to make the lubricant in bearing assemblies 330 seek the same level as the center of the channel segments. Centrifugal force and hydrostatic pressure work together with the geometry of lubricant channel 419 to ensure that the entire needle bearing 31 is lubricated.

FIG. 14 shows how one end of lubricant channel 419 is connected to lubricant port 320, and the other end is connected to lubricant port 326.

Closed-end bearing assemblies 330 and the bearing assemblies comprising races 32 can be interchanged, although assemblies 330 are preferred. Ring 35 is used to carry thrust load and to provide a seal when bearing assemblies comprising races 32 are used. Ring 35 can also be used in place of snap rings 336 to retain assemblies 330 in place. In fact, in the embodiment of the present invention shown in FIG. 13, universal joint 410, it is preferred to use ring 35 instead of snap rings 336, as it may be less expensive to manufacture ring 415 without snap-ring grooves 337. Such a joint is the preferred embodiment of the present invention.

The rings can be interchanged - that is, rings shown in embodiment can be used in other embodiments. However, ring 415 is the preferred ring, due to its ease of manufacture.

Pins 21, 22, 321, and 322 preferably have the same surface hardness as needle bearings 31; this is preferably a surface hardness of 60–65 Rockwell C.

Holes 33, 333, 41, 341, 42, and 342 are preferably made by line-boring. Line boring these holes enables very accurate pin alignment to be achieved; accurate pin alignment helps to increase the life of the joint by extending the life of the bearings.

The smooth outer surface of yoke 311 is helpful in that stresses can be evenly distributed thereover, rather than being concentrated at sharp edges.

Universal joint 500 includes an input shaft 514, an output shaft 540, and a coupling member 550 comprising two hemispherical split-cup yokes 511 and a shaft 613. Ring 415 interconnects shafts 514 and 540 with yokes 511 in the same manner that ring 415 interconnects shafts 314 and 340 with yokes 311 in joint 300.

Universal joint 500 differs from universal joint 300 in that joint 500 includes a centering device 700. Centering device 700 includes a pair of ball studs 712, each connected to a centering plate 770, which in turn is connected to a centering pin 771. The ball stud 712 may be integrally formed with the centering plate 770 and centering pin 771. Centering pins 771 are received in centering sleeve 772, which in turn is received in bore 776 in coupling member 550.

Received within cavities 777 in shafts 514 and 540 are springs 775, sockets 711 of centering device 700, and elastomer-type lip seals 738. Ball studs 712 are received in sockets 711.

Rubber O-rings 739 are received in grooves 740 in centering plate 770. O-rings 739 and sealing rings 738 serve to contain lubricant (not shown) in cavities 777 and bore 776. The lubricant can flow from one cavity 777 to the other through lubrication bores 773 in ball-pin centering plate 774, and can flow from either cavity 777 into bore 776 via bores 773 and a hole 778 in the wall of sleeve 772. The lubricant can be pre-loaded in bore 776, cavities 777, and bores 773, or it can be pumped into them via an optional grease zerk (not shown in the drawings) which communicates with bore 776.

Closed-end needle bearing assembly 530 includes races 532, needle bearings 531, and elastomer-type lip seal 539.

When joint 500 operates at an angle, centering pins 771 and centering sleeve 772 of centering device 700 must orbit within the space provided in bore 776 in coupling member 550. The closer that ball 712 is to the pivot point of shafts 514 and 540, the smaller the orbital path of centering plate 770 will be. This is significant because the amount of orbiting which occurs in the twin ball and centering plate-type double Cardan joint is harder to control. The smaller the orbital path, the less wear on mating parts and seals.

Joint 500 is the first ring-type universal joint with a centering device. Joint 500 is the first self-supported double ring joint.

Centering device 700 allows joint 500 to operate at constant velocity at all angles within the design range of joint 500 (0-90 degrees).

The center of ball stud 712 and socket 711 of centering device 700 can be placed adjacent the pivot point of the input shaft 514 and output shaft 540. The center of ball stud 712 and socket 711 of centering device 700 can be placed closer to the pivot point of the input shaft 514 and output shaft 540 than in other universal joints. The closer the ball stud 712 and socket 711 are placed to this pivot point the smaller the magnitude of oscillation of the ball stud 712 in the socket 711 will be. Conversely, the other centering devices of which the inventor is aware are located at the center of the joint making the degree or magnitude of oscillation equal to the total joint angle. Centering device 700 incorporates two ball studs 712 and sockets 711 which will experience oscillations in the socket at one half of the total joint angle.

The location of ball studs 712 and sockets 711 in relation to the pivot point of the input and output shafts 514 and 540 can control the degree of oscillation of centering plate 770 in relation to coupling member 550. This is why not much room is needed in bore 776.

Like the Double Cardan twin ball and centering plate-type centering devices, centering device 700 allows joint 500 to operate at all angles in the design range, where the instantaneous angular velocity ratio is unity. In other words, joint 500 will operate at constant velocity at all angles. The centering device of other double-Cardan joints will only allow the joints to operate at true constant velocity at one design angle and at 0 degrees.

Centering device 700 includes two ball-pin centering plates 774 which are allowed to oscillate within bore 776 in coupling member 550 as joint 500 rotates at an angle.

Joint 500 is assembled in the same manner as is joint 300. Ball-pin centering plates 774 are held together by being pressed (i.e., press fit) into sleeve 772, and sockets 711 are inserted into cavities 777 after springs 775 are received in cavities 777. A metal ring, for example, can hold sealing rings 738 in place. The metal ring can be press-fit into cavity 777.

Lubricant may be stored in bore 776 and supplied to ball studs 712 and sockets 711 via a single hole 778 in centering sleeve 772.

As centering device 700 oscillates within coupling member 550 lubricant is continuously packed via hole 778 into sleeve 772 and ball-pin centering plates 774, providing positive pressure or feed of lubricant to ball studs 712 and sockets 711.

Centering device 700 functions as a self-aligning bearing and provides internal supporting and centering means for universal joint 500.

General information about centering devices for universal joints can be found, for example, in the Society of Automotive Engineers Universal Joint and Driveshaft Design Manual (AE-7) (1979), especially at pages 103, 112-115, 123, 124, 323, and 324, hereby incorporated by reference. For high-speed applications, additional bearings can be added as described in the above-mentioned pages of the design manual.

Figure 17:
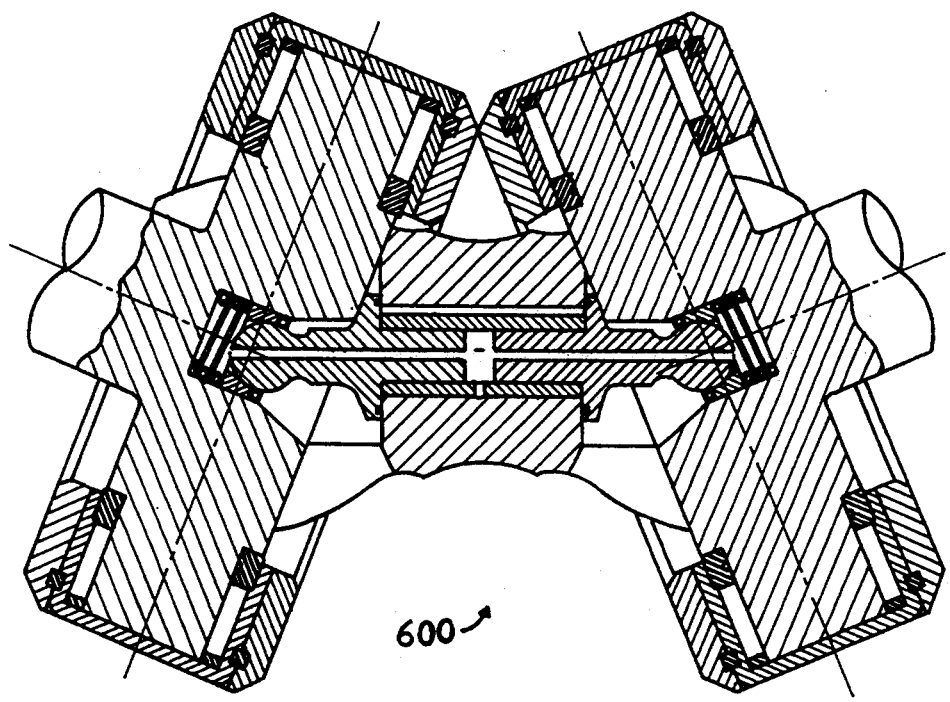
FIG. 17 is a sectional view of a sixth embodiment of the present invention, showing the input and output shafts at an angle.
Figure 18:
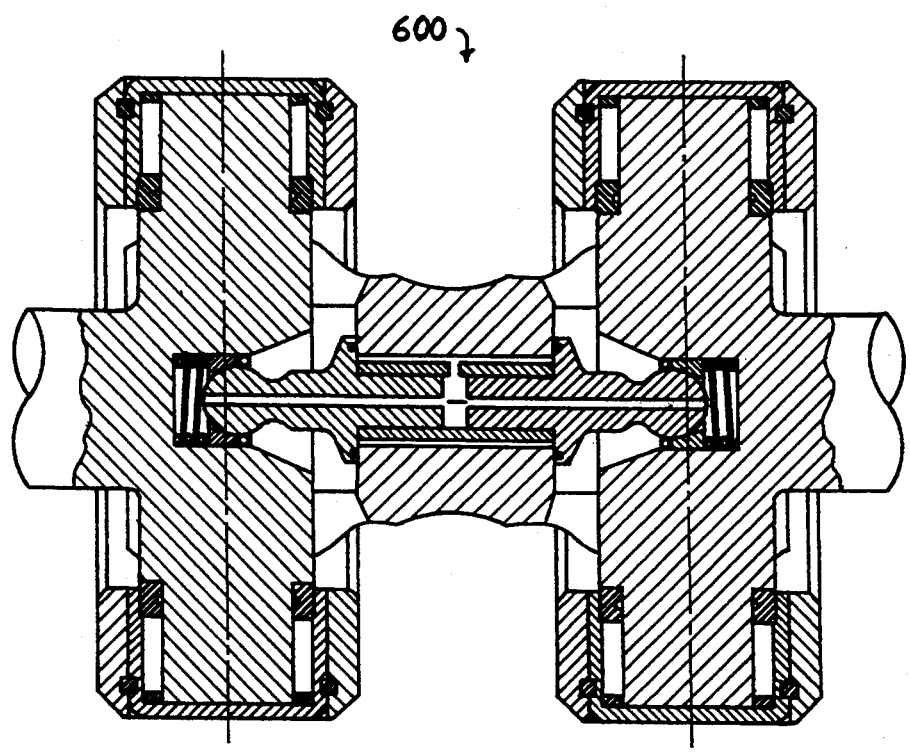
FIG. 18 is a sectional view of the sixth embodiment of the present invention.

FIGS. 17 and 18 show a sixth embodiment of the invention, universal joint 600. Joint 600 is substantially similar to joint 500.

Figure 19:
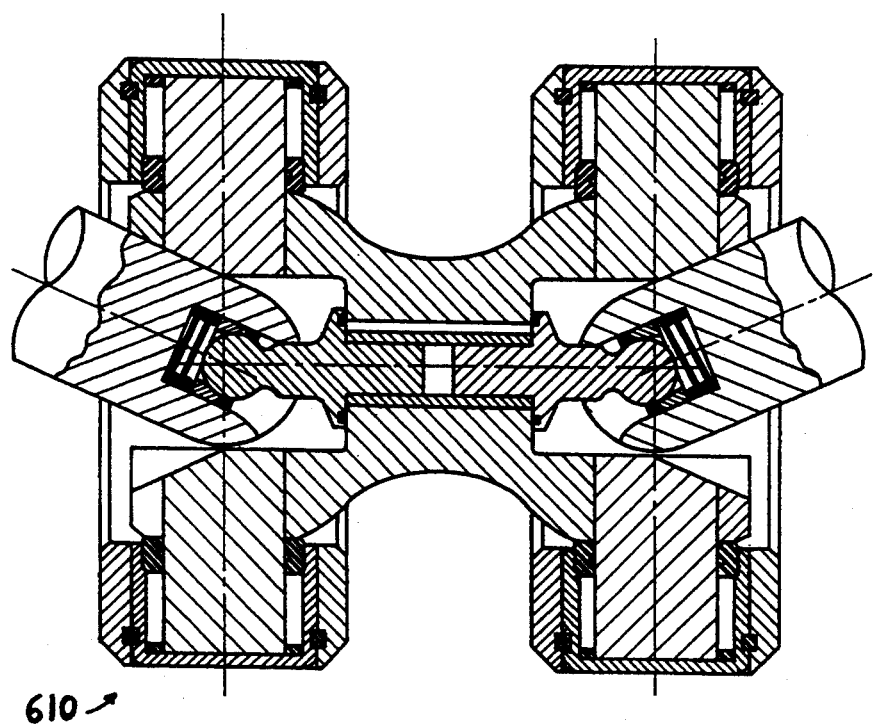
FIG. 19 is a sectional view of a seventh embodiment of the present invention, showing the input and output shafts at an angle.
Figure 20:
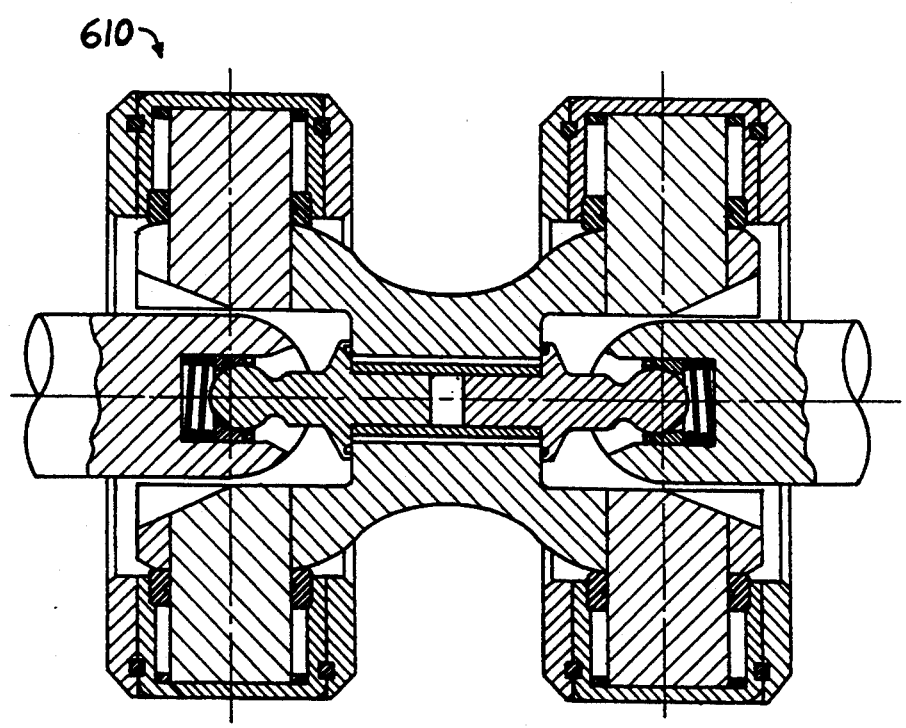
FIG. 20 is a sectional view of the seventh embodiment of the present invention.

FIGS. 19 and 20 show a seventh embodiment of the invention, universal joint 610. Joint 610 is substantially similar to joint 600, but does not include bores 773 and hole 778. Joint 610, however, preferably does include bores 773 and hole 778 to allow lubricant to flow through ball-pin centering plates 774.

Whenever "press-fit" has been used herein, "shrink-fit" could also have been used. Press fitting involves forcing together, for example, a pin into a hole of slightly smaller diameter than the pin, simply by mechanical force. Shrink fitting involves heating the part containing the hole and cooling the pin so that the diameter of the hole can be even smaller compared to the diameter of the pin than is possible with press fitting, resulting in a tighter fit of parts.

Instead of making a 90° joint by attaching two yokes of 45° joints with a shaft, a 90° joint can be made by attaching two balls or two dual trunnions with a shaft. This type of 90° joint may prove easier to manufacture.

The foregoing embodiments are presented by way of example only; the scope of the present invention is to be limited only by the following claims.

I claim:

1. A universal joint comprising:
   (a) first and second rings;
   (b) first and second yokes disposed within the first and second rings, respectively;
   (c) first and second shafts;
   (d) first pin means pivotally interconnecting the first yoke and the first ring;
   (e) second pin means pivotally interconnecting the first shaft and the first ring;
   (f) third pin means pivotally interconnecting the second yoke and the second ring;
   (g) fourth pin means interconnecting the second shaft and the second ring;
   (h) a third shaft interconnecting the first yoke and the second yoke;
   (i) a plurality of bearing means in each ring, the bearing means in the first ring receiving the first and second pin means, and the bearing means in the second ring receiving the third and fourth pin means; and
   (j) centering means, at least partially contained within the third shaft, interconnecting the first shaft and the second shaft.

2. The joint of claim 1, wherein the universal joint is a constant velocity universal joint.

3. The joint of claim 1, wherein the centering means allows the joint to operate at constant velocity at all angles in a predetermined design range.

4. A universal joint comprising:
   (a) first and second rings;

(b) first and second yokes disposed within the first and second rings, respectively;
(c) first and second shafts;
(d) first pin means pivotally interconnecting the first yoke and the first ring;
(e) second pin means pivotally interconnecting the first shaft and the first ring;
(f) third pin means pivotally interconnecting the second yoke and the second ring;
(g) fourth pin means interconnecting the second shaft and the second ring;
(h) a third shaft interconnecting the first yoke and the second yoke;
(i) a plurality of bearing means in each ring, the bearing means in the first ring receiving the first and second pin means, and the bearing means in the second ring receiving the third and fourth pin means; and
(j) centering means interconnecting the first shaft and the second shaft, wherein the centering means comprises:
a pair of balls and sockets, with a ball and socket adjacent the pivot point of each of the first and second shafts, the balls being interconnected.

5. The universal joint of claim 4, wherein:
the first yoke, the second yoke, and the third shaft define a coupling member; and
the balls of the centering means are interconnected with a sleeve within the coupling member.

6. The universal joint of claim 5, wherein:
as the centering means oscillates within the coupling member, lubricant is continuously packed via a hole in the sleeve into the sleeve, providing feed of lubricant to the balls.

7. A universal joint comprising:
(a) first and second rings;
(b) first and second yokes disposed within the first and second rings, respectively;
(c) first and second shafts;
(d) first pin means pivotally interconnecting the first yoke and the first ring;
(e) second pin means pivotally interconnecting the first shaft and the first ring;
(f) third pin means pivotally interconnecting the second yoke and the second ring;
(g) fourth pin means interconnecting the second shaft and the second ring;
(h) a third shaft interconnecting the first yoke and the second yoke;
(i) a plurality of bearing means in each ring, the bearing means in the first ring receiving the first and second pin means, and the bearing means in the second ring receiving the third and fourth pin means; and
(j) centering means interconnecting the first shaft and the second shaft, wherein:
the centering means comprises:
a ball and socket adjacent the pivot point of each of the first and second shafts.

8. A universal joint comprising:
(a) first and second rings;
(b) first and second yokes disposed within the first and second rings, respectively;
(c) first and second shafts;
(d) first pin means pivotally interconnecting the first yoke and the first ring:
(e) second pin means pivotally interconnecting the first shaft and the first ring;
(f) third pin means pivotally interconnecting the second yoke and the second ring;
(g) fourth pin means interconnecting the second shaft and the second ring;
(h) a third shaft interconnecting the first yoke and the second yoke;
(i) a plurality of bearing means in each ring, the bearing means in the first ring receiving the first and second pin means, and the bearing means in the second ring receiving the third and fourth pin means;
(j) centering means interconnecting the first shaft and the second shaft; and
(k) means for allowing the first shaft to move up to 90° relative to the second shaft.

* * * * *